3,198,701
METHOD OF CURBING APPETITE WITH 1-PHENOXY-2-AMINO-PROPANE

Karl Zeile and Otto Thomä, Ingelheim, Germany, assignors, by mesne assignments, to Boehringer Ingelheim G.m.b.H., Ingelheim (Rhine), Germany, a corporation of Germany
No Drawing. Filed July 10, 1962, Ser. No. 208,917
Claims priority, application Great Britain, July 31, 1961, 27,743/61
2 Claims. (Cl. 167—55)

This invention relates to appetite-curbing compositions as well as to a method for curbing the appetite.

More particularly, the present invention relates to appetite-curbing compositions comprising 1-phenoxy-2-amino-propane or a non-toxic, pharmacologically acceptable acid addition salt thereof as an active ingredient, and to a method of curbing the appetite by administering 1-phenoxy-2-amino-propane or a non-toxic acid addition salt thereof.

Various compounds which are similar in structure to 1-phenoxy-2-amino-propane have been suggested and tested as appetite-depressants; for instance, 1-phenyl-2-amino-propane (amphetamine) and 1-phenyl-2-diethyl-amino-1-propanone (Tenuate). However, these compounds exhibit a number of undesirable side-effects, notably excessive stimulation of the central nervous system. In many cases, therefore, these compounds are contraindicated.

It is an object of the present invention to provide pharmaceutical compositions with effective appetite-depressant properties, but susbtantially free from undesirable side-effects, notably free from stimulating effects on the central nervous system.

It is another object of the present invention to provide a method of producing anorexia without concurrent stimulation of the central nervous system.

Still other objects and advantages of the present invention will become apparent as the description thereof proceeds.

We have discovered that anorexia is produced, that is, the desire for food intake is effectively depressed, without concurrent stimulation of the central nervous system, by administering per os or parenterally from 20 to 100 mgm., preferably 30 to 50 mgm., of a compound selected from the group consisting of 1-phenoxy-2-amino-propane of the formula

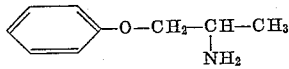

and its non-toxic, pharmacologically acceptable acid addition salts.

In order to demonstrate the effective appetite-curbing activity of 1-phenoxy-2-amino-propane and its non-toxic acid addition salts as well as their surprisingly low central nervous system stimulating activity, certain standard pharmacological tests were performed wherein the compounds according to the present invention were also subjected to comparison with structurally related compounds having appetite-depressant properties.

First, the dose of each compound in question which reduces the food intake of rats to 50% of normal was determined after subcutaneous and peroral administration. For this purpose, varying amounts of each compound in question were administered both subcutaneously and perorally to from 2 to 6 groups of 6 animals each. The amount of food intake per unit of time was measured after each administration and was compared to the food intake rate of an untreated control group. The reduction of the food intake rate, if any, after administration of the compounds in question as compared with the normal rate was expressed in terms of percentage reduction, and the values were recorded on a graph. By interpolation, the amount of each compound which reduces the food intake rate by 5% ($ED_{50}$) was graphically determined. The following values were obtained:

TABLE I

| Compound (racemic hydrochloride) | $ED_{50}$ subcutaneous, mgm./kg. | $ED_{50}$ per os, mgm./kg. |
|---|---|---|
| 1-phenyl-2-amino-propane (Amphetamine) | 2.0 | 2.4 |
| 1-phenyl-2-diethylamine-1-propanone (Tenuate) | 11.0 | 6.1 |
| 1-phenoxy-2-amino-propane | 14.0 | 20.0 |

Thereafter, each of the compounds in question was investigated for its stimulating effect upon the central nervous system of laboratory mice, as indicated by the spontaneously motoricity. For this purpose, varying amounts of the compounds were injected subcutaneously into separate groups of adult white mice. After each administration the number of animals showing motorial excitation were counted, and the value was recorded on a graph. After a sufficient number of values had been obtained, the dose at which 50% of the animals showed noticeable motorial excitation ($ED_{50}$) was calculated for each compound by the method of Kärber (Arch. exp. Path. Pharmakol, vol. 162, pages 480 (1931)).

The following results were obtained:

TABLE II

| Compound (racemic hydrochloride) | $ED_{50}$ subcutaneous, mgm./kg. |
|---|---|
| 1-phenyl-2-amino-propane | 1.95 |
| 1-phenyl-2-diethylamino-1-propanone | 41.0 |
| 1-phenoxy-2-amino-propane | 80 |

An examination of the values tabulated in Tables I and II above shows that while 1-phenoxy-2-amino-propane is only about 1/7 to 1/8 as effective as an appetite depressant as 1-phenyl-2-amino-propane, its central nervous system stimulating activity is only about 1/40 that of 1-phenyl-2-amino-propane. In other words, even though the dose of 1-phenoxy-2-amino-propane needed to produce an equal appetite-depressant effect is 7 to 8 times greater than that of 1-phenyl-2-amino-propane, the central nervous system stimulating effect of such a dose of 1-phenoxy-2-amino-propane is still only about 1/5 that of 1-phenyl-2-amino-propane.

Similarly, while Table I shows that 1-phenoxy-2-amino-propane is somewhat less effective as an appetite-depressant than 1-phenyl-2-diethyl-amino-1-propanone, Table II shows quite clearly that its central nervous system stimulating activity is only about one-half that of 1-phenyl-2-diethylamino-1-propanone.

The surprisingly favorable relationship between appetite-depressant activity and central nervous system stimulating activity for 1-phenoxy-2-amino-propane can also be effectively illustrated by calculating the ratio of the $ED_{50}$ from Table II to the $ED_{50}$ from Table I for each of the compounds under consideration. The following values are obtained:

TABLE III

| Compound | Ratio: $\dfrac{ED_{50}\text{ Table II}}{ED_{50}\text{ Table I}}$ |
|---|---|
| 1-phenyl-2-amino-propane | 0.98 |
| 1-phenyl-2-diethylamino-1-propanone | 3.73 |
| 1-phenoxy-2-amino-propane | 5.72 |

These values show that the ratio for 1-phenoxy-2-amino-propane is more than 5 times as great as that for Amphetamine and about 1.5 times as favorable as that for Tenuate.

When the motorial excitation of rats was studied with the aid of the vibrating cage method, the low central nervous system stimulating activity of 1-phenoxy-2-amino-propane was even more clearly demonstrated. The vibrating cage was mounted in such a way that only oscillations of substantial size were counted; that is, substantially only whole-body movements, exclusive of cleaning and nibbling, of the animals in the cage were taken into consideration. Each substantial oscillation caused the cage to touch a contact element, thereby closing an electrical circuit. The number of electrical impulses thus created was recorded over a period of five to six hours by means of an electronic counting device. The sensitivity and the natural period of oscillation of the cage were continuously controlled by means of a standard pendulum.

The tests were carried out on groups of six adult rats. In order to obtain a control value, groups of six untreated rats were placed into the cage and the natural motility of the animals over a period of a whole day was observed and recorded in terms of number of contacts per hour. The average control value thus obtained was 402 contacts per hour. Thereafter, varying doses each of the compounds under consideration were administered to separate groups of rats by subcutaneous injection, and the animals were placed into the vibrating cage. The number of electrical contacts was counted over a period of five to six hours and was recorded on a graph in terms of contacts per hour. From this graph, the dose of each compound which produces 5000 contacts per hour was calculated ($ED_{5000}$). The following table shows the values obtained:

TABLE IV

| Compound (racemic hydrochloride) | $ED_{5000}$, mgm./kg. |
|---|---|
| 1-phenyl-2-amino-propane | 0.84 |
| 1-phenyl-2-diethylamino-1-propanone | 5.2 |
| 1-phenoxy-2-amino-propane | (1) |

[1] At doses up to 60 mgm./kg. the number of contacts per hour was only 1327.

The values tabulated above show that while 1-phenyl-2-amino-propane and 1-phenyl-2-diethylamino-1-propanone produced 5000 contacts per hour at relatively low doses, a very large dose of 60 mgm./kg. of 1-phenoxy-2-amino-propane did not even approach the $ED_{5000}$ value. Consequently, a valid comparison of the compounds on the basis of their $ED_{5000}$ values was not possible. For the purpose of valid comparison, therefore, the doses were calculated on the basis of the $ED_{1327}$, the dose of each compound which produces 1327 contacts per hour. The following table shows the values obtained:

TABLE V

| Compound (racemic hydrochloride) | $ED_{1327}$, mgm./kg. |
|---|---|
| 1-phenyl-2-amino-propane | 0.6 |
| 1-phenyl-2-diethylamino-1-propanone | 3.5 |
| 1-phenoxy-2-amino-propane | 60.0 |

The toxicity of 1-phenoxy-2-amino-propane is very low. The subcutaneous $LD_{50}$ in mice is 235 mgm./kg. and the peroral $LD_{50}$ in mice is 520 mgm./kg.

1-phenoxy-2-amino-propane is a known compound. It may be prepared, for example, by catalytic hydrogenation of the oxime of 2-phenoxy-acetone in the presence of a nickel catalyst. At room temperature it is a colorless oil. Its hydrochloride has a melting point of 147–148° C. (Hurd and Perletz, J.A.C.S., 68, 38–40).

In addition to the hydrochloride, other non-toxic, pharmacologically acceptable acid addition salts of 1-phenoxy-2-amino-propane are the sulfate, bromide, tartrate, citrate, succinate, phosphate, nitrate, acetate, propionate, butyrate, valerate, oxalate, malonate, maleate, fumarate, lactate, malate, benzoate, phthalate, cinnamate, salicylate, nicotinate, 2-furoate, 8-chlorotheophyllinate and the like.

Dosage unit compositions for oral administration are particularly preferred and may be in liquid, syrupy or solid form. Thus, for example, the compounds according to the invention may be compounded with an aqueous or oily medium in the form of suspensions, emulsions, syrups or like formulation, said formulation also containing, if desired, such inert additives as suspending agents, dispersing agents, flavoring agents and/or sweetening agents. One may also with advantage prepare solid formulations, for example, powders or granulates. Preferably, however, the compositions are formulated as solid dosage units for oral administration, such as tablets, capsules, pills or coated pills, in which the compounds are in association with a solid carrier. In particular, one may thus provide tablets containing the active compounds, in which the compounds are in association with suitable tablet-forming additives, for example with sugars, such as lactose or sucrose, finely divided silicic acid, talcum lubricants, such as magnesium stearate or glycerol, and/or binders, such as starch, alginic acid, polyvinyl pyrrolidone or gelatin. Each dosage unit preferably contains 20–100 mgm., advantageously 30–50 mgm., of 1-phenoxy-2-aminopropane or a non-toxic, pharmacologically acceptable salt thereof.

In compositions for rectal administration the pharmaceutical carrier generally includes a suppository base, such as a glyceride or cocoa butter.

The following examples illustrate typical appetite-curbing dosage unit compositions according to the present invention. It should be understood, however, that the present invention is not limited to these particular examples. The parts are parts by weight unless otherwise specified:

*Example I*

The tablets are compounded from the following ingredients:

| | Parts |
|---|---|
| 1-phenoxy-2-aminopropane·HCl | 30 |
| Powdered lactose | 110 |
| Corn starch | 52 |
| Gelatin | 3 |
| Finely divided silicic acid | 3 |
| Magnesium stearate | 2 |
| | 200 |

The 1-phenoxy-2-aminopropane salt, the lactose and part of the corn starch and silicic acid are mixed together and the mixture is granulated with a 10% solution of the gelatin. The granulate is then passed through a screen of 1.5 mm. mesh, dried for about 12 hours at 45° C. and the dried granulate is again passed through a screen of 1.5 mm. mesh. The granulate is then mixed with the rest of the corn starch and silicic acid and with the magnesium stearate and the mixture is compressed into tablets of 200 mgm. weight each.

*Example II*

The tablets are compounded from the following ingredients:

| | Parts |
|---|---|
| 1-phenoxy-2-amino-propane·HCl | 75 |
| Castor wax | 105 |
| Powdered lactose | 15 |
| Corn starch | 13 |
| Talcum | 10 |
| Magnesium stearate | 2 |
| | 220 |

The 1-phenoxy-2-amino-propane is evenly dispersed in a melt of the castor wax and the molten mixture is stirred until cool. The solidified melt is broken down to a particle size of 1.5 mm. and is mixed with a granulate of the lactose and corn starch and with the talcum and magnesium stearate. It is finally compressed into tablets of 220 mgm. each.

*Example III.—Powder*

The powder is compounded from the following ingredients:

| | Parts |
|---|---|
| 1-phenoxy-2-amino-propane·HCl | 30 |
| Lactose, q.s. ad | 500 |

The active material is homogenized with the lactose and the mixture is filled into powder-capsules containing 500 mgm. of the mixture.

*Example IV.—Capsules*

The contents of the capsules are compounded from the following ingredients:

| | Parts |
|---|---|
| 1-phenoxy-2-amino-propane·HCl | 30 |
| Lactose, q.s. ad | 260 |

The active substance is homogenized with the lactose and the mixture is filled into gelatine capsules containing 260 mgm. of the mixture.

Obviously, 1-phenoxy-2-amino-propane or any of the other non-toxic, pharmacologically acceptable acid addition salts may be substituted in the above illustrated compositions for the hydrochloride used therein.

While we have illustrated our invention with the aid of certain specific embodiments thereof, it will be readily apparent to those skilled in the art that the invention is not limited to these embodiments and that various changes and modifications may be made without departing from the spirit of the invention or the scope of the appended claims.

We claim:

1. The method of curbing the appetite of warm-blooded animals without, at the same time, stimulating the central nervous system of said animals, which comprises orally administering to said animals from 20 to 100 mgm. of a compound selected from the group consisting of 1-phenoxy-2-amino-propane and its non-toxic, pharmacologically acceptable acid addition salts.

2. The method of curbing the appetite of warm-blooded animals without, at the same time, stimulating the central nervous system of said animals, which comprises orally administering to said animals from 20 to 100 mgm. of 1-phenoxy-2-amino-propane hydrochloride.

References Cited by the Examiner

Polonovski, Acad. des Sciences, Comptes Rendus, vol. 235, November 1952, pages 1254–1256.

Schmitt—Chem. Abst. vol. 47, 1953, page 205f.

U.S. Dispensatory—25th edition—1955—Lippincott Co., Philadelphia, Pa., page 86.

JULIAN S. LEVITT, *Primary Examiner.*

FRANK CACCIAPAGLIA, Jr., LEWIS GOTTS,
*Examiners.*

UNITED STATES PATENT OFFICE
CERTIFICATE OF CORRECTION

Patent No. 3,198,701　　　　　　　　　　　　　　　　August 3, 1965

Karl Zeile et al.

It is hereby certified that error appears in the above numbered patent requiring correction and that the said Letters Patent should read as corrected below.

Column 1, line 33, for "susbtantially" read -- substantially --; column 2, line 12, for "5%" read -- 50% --; line 36, for "pages" read -- page --.

Signed and sealed this 25th day of January 1966.

(SEAL)
Attest:

ERNEST W. SWIDER　　　　　　　　　　　　　　　EDWARD J. BRENNER
Attesting Officer　　　　　　　　　　　　　　　　Commissioner of Patents